(12) United States Patent
Haakenson et al.

(10) Patent No.: US 11,771,080 B2
(45) Date of Patent: Oct. 3, 2023

(54) LADDER STAND

(71) Applicant: ARDISAM, INC., Cumberland, WI (US)

(72) Inventors: Bryant Haakenson, Amery, WI (US); Michael Furseth, Cumberland, WI (US); Scott Nickell, Cumberland, WI (US); Blake Otto, Gladwin, MI (US)

(73) Assignee: ARDISAM, INC., Cumberland, WI (US)

( * ) Notice: Subject to any disclaimer, the term of this patent is extended or adjusted under 35 U.S.C. 154(b) by 0 days.

(21) Appl. No.: 18/057,752

(22) Filed: Nov. 21, 2022

(65) Prior Publication Data

US 2023/0082762 A1 Mar. 16, 2023

Related U.S. Application Data

(62) Division of application No. 16/724,095, filed on Dec. 20, 2019, now Pat. No. 11,564,387.

(51) Int. Cl.
   *A01M 31/02* (2006.01)
(52) U.S. Cl.
   CPC .................................. *A01M 31/02* (2013.01)
(58) Field of Classification Search
   CPC ....... A01M 31/02; A01M 31/025; E06C 1/34; E06C 7/06; E06C 7/182; E06C 7/16; E06C 7/188
   USPC ........................................................ 182/116
   See application file for complete search history.

(56) References Cited

U.S. PATENT DOCUMENTS

| | | | | |
|---|---|---|---|---|
| 5,310,019 A | * | 5/1994 | Paul | A01M 31/02 182/135 |
| 5,580,129 A | | 12/1996 | Findlay | |
| 5,975,389 A | * | 11/1999 | Braun | A45F 4/02 224/916 |
| 6,053,278 A | * | 4/2000 | Myers | A01M 31/02 182/20 |
| 6,890,033 B1 | * | 5/2005 | Casella | A47C 4/42 297/344.21 |

(Continued)

OTHER PUBLICATIONS

Hawk Hunting, "Hercules Cross Grip Safety System Ladder Stand", URL: https://www.hawkhunting.com/hawk-upgrades-ladder-stands-hercules/, Jan. 10, 2018.

(Continued)

*Primary Examiner* — Muhammad Ijaz
(74) *Attorney, Agent, or Firm* — Perkins Coie LLP

(57) ABSTRACT

A ladder stand includes a ladder portion, a platform on the ladder portion, and a plurality of support straps to hold the ladder stand against a support structure. The plurality of support straps may include upper support straps that are each connected to the ladder stand, wrap partially around the tree, and connect to each other with a connecting device, to position the tree between the ladder stand and the straps. The platform may include a blade element positioned to press against the tree when the support straps are tightened against the tree. A method of installing a ladder stand may include connecting ends of the upper support straps to each other after passing the ends around an obstruction on the tree. A user may pull on other ends of the straps to draw the straps upward along the tree until they are approximately level with the blade element.

20 Claims, 6 Drawing Sheets

(56) References Cited

U.S. PATENT DOCUMENTS

| | | | | |
|---|---|---|---|---|
| 7,594,351 | B1* | 9/2009 | Walker | F41A 23/18 |
| | | | | 294/82.11 |
| 8,167,374 | B2* | 5/2012 | Findlay | A47C 1/0265 |
| | | | | 297/344.21 |
| 8,973,708 | B1* | 3/2015 | Fenner | A01M 31/02 |
| | | | | 182/12 |
| 8,991,555 | B2* | 3/2015 | Furseth | E06C 7/48 |
| | | | | 182/187 |
| 10,100,576 | B1 | 10/2018 | Dimovski | |
| 10,736,313 | B1* | 8/2020 | Sandel | A01M 31/025 |
| 11,234,433 | B2* | 2/2022 | Berkbuegler | A01M 31/02 |
| 2005/0056487 | A1* | 3/2005 | Concepcion | E06C 1/34 |
| | | | | 182/136 |
| 2005/0178615 | A1* | 8/2005 | Woller | E06C 7/081 |
| | | | | 182/116 |
| 2008/0105490 | A1* | 5/2008 | Butcher | A01M 31/02 |
| | | | | 182/116 |
| 2009/0229917 | A1* | 9/2009 | Berkbuegler | A01M 31/02 |
| | | | | 182/187 |
| 2013/0248287 | A1* | 9/2013 | Furseth | A01M 31/02 |
| | | | | 182/115 |
| 2015/0129360 | A1* | 5/2015 | Shiver | E06C 1/06 |
| | | | | 182/116 |
| 2017/0142959 | A1 | 5/2017 | Berkbuegler | |
| 2017/0211904 | A1* | 7/2017 | Matthews | F41A 23/02 |
| 2019/0281812 | A1* | 9/2019 | Lee | E06C 7/14 |
| 2020/0000084 | A1* | 1/2020 | McGucken, III | A47C 3/18 |
| 2020/0336581 | A1* | 10/2020 | Allen | F16M 11/16 |
| 2020/0344997 | A1* | 11/2020 | Berkbuegler | A01M 31/02 |
| 2020/0383315 | A1* | 12/2020 | Overbaugh | E04G 1/30 |
| 2021/0186000 | A1 | 6/2021 | Haakenson et al. | |
| 2021/0186001 | A1 | 6/2021 | Haakenson et al. | |

OTHER PUBLICATIONS

Leverage, "5100 Tree Stand Review—Outdoorfreaks.net, YouTube", URL: https://www.youtube.com/watch?v=3SJ2QjMFGdw, Sep. 13, 2012.

Leverage, "Outcast Model 5300 Telescoping Ladder Stand", 2013.

Leverage, "Outcast Telescoping Ladder Stand, YouTube", URL: https://www.youtube.com/watch?v=WK-jllUUQao, Jun. 6, 2012.

Lock Jawz, "Lockjawz Tree Stands, Facebook Video", URL: https://www.facebook.com/lockjawztreestands/, exact publication date unknown, web page visited Sep. 21, 2020.

Primal Vantage, "Grip Jaw & Backbone Stabilizer Truss System, Web Video", URL: https://www.primaltreestands.com/press/hp2-introducing-the-new-innovative-emergency-descent-device-3, Jul. 23, 2018.

River's Edge Treestands, "Lockdown Ladder Stands from Rivers Edge, YouTube", URL: https://www.youtube.com/watch?v=H2timkvMeTU&t=2s, Dec. 20, 2017.

Rock West Composites, "Telescoping Clamps", URL: https://www.rockwestcomposites.com/shop/connector-accessories/locking-telescoping-mechanisms/telescoping-clamps, website visited Feb. 3, 2021.

Trophy Treestands, "Draw Tight Demo, YouTube", URL: https://www.youtube.com/watch?v=kcbsSHFETjc, Dec. 6, 2019.

Trophy Treestands, "Jaw Safety System Demo 1, YouTube", URL: https://www.youtube.com/watch?v=zv2nOgResSw, Aug. 26, 2019.

Trophy Treestands, "Single Person Ladderstand", URL: https://www.trophytreestands.com/product-page/f-15, exact publication date unknown, web page visited Sep. 16, 2020.

X-STAND, "Jaw Safety System, YouTube", URL: https://www.youtube.com/watch?v=tkP61J1FFEghttps, Aug. 18, 2016.

* cited by examiner

LADDER STAND

CROSS-REFERENCE TO RELATED APPLICATIONS

This application is a divisional of U.S. patent application Ser. No. 16/724,095, filed Dec. 20, 2019, which is incorporated herein by reference in its entirety.

BACKGROUND

Hunters, wildlife observers, and others use portable ladder stands (also called tree stands) to conceal themselves from wildlife or to have an elevated perspective for observing wildlife. Such a ladder stand may be permanently or temporarily attached to a structure, such as a tree. A ladder stand advantageously allows a user to carry minimal structure into a remote area and to rely on natural features to support the stand.

Existing ladder stands have several drawbacks. For example, existing stands may not work on trees with branches because installation requires positioning support straps over or around branches. Existing stands that rely on movable jaws to hold a tree may work only on a limited range of tree sizes. Such movable-jaw systems may also be difficult to install or uninstall because the jaws may need to be operated (such as opening or closing) while a user is on an upper platform of the stand, meaning a user may need to climb the stand before it is safely secured to the tree. Existing stands also tend to apply a downward force on the upper attachment point to the tree, which can cause the stand to shift down the tree and become unstable while climbing. Further, existing stands may have only one strap to tighten a tree blade against a tree. Because trees are typically not uniform, having only one strap to tighten the blade against a tree can result in an uneven or twisted contact with the tree.

SUMMARY

Representative embodiments of the present technology include a ladder stand having a blade element that is drawn toward a support structure, such as a tree, by two straps that extend from the ladder stand, wrap partially around the tree, and connect to each other at the backside of the tree or otherwise adjacent to the tree to position the tree between the blade element and the straps. The straps may be connected to each other by a connecting device so that a user or installer may pass each strap around the tree individually. By connecting the straps together after passing them around the tree, a user may position the straps to avoid obstructions on the tree before tightening the straps to draw the blade element into the tree. The straps may be positioned to be generally level or horizontal with the blade element to provide a primarily horizontal or perpendicular force to draw the blade element against or into the tree. In some embodiments, a stabilizer bar may be positioned below a platform of the ladder stand, between a ladder portion of the ladder stand and the tree, to further stabilize the ladder stand against the tree.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the several views.

DETAILED DESCRIPTION

The present technology is directed to ladder stands, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as those common to ladder stands, chairs, or ladders, may not be shown or described in detail so as to avoid unnecessarily obscuring the relevant description of the various embodiments. Accordingly, embodiments of the present technology may include additional elements or exclude some of the elements described below with reference to FIGS. 1-6, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all the items in the list, or (c) any combination of items in the list. Further, unless otherwise specified, terms such as "attached" or "connected" are intended to include integral connections, as well as connections between physically separate components.

Figure 1:
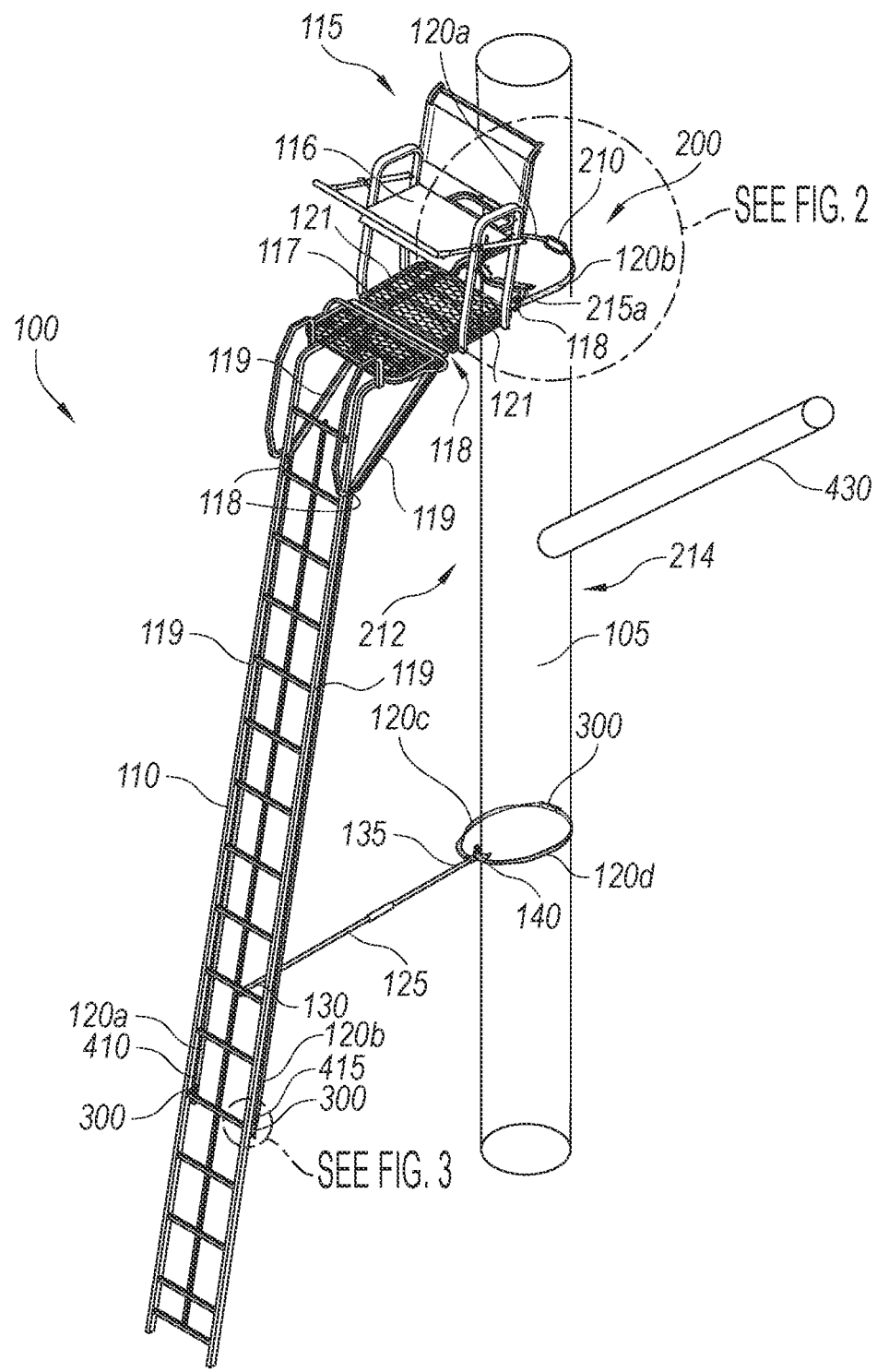
FIG. 1 illustrates a ladder stand configured in accordance with embodiments of the present technology, in a deployed position and attached to a support structure.

FIG. 1 illustrates a ladder stand 100 configured in accordance with embodiments of the present technology, in a deployed position and attached to a support structure 105, which may include a tree, a pole, or another sturdy structure. The ladder stand 100 includes a ladder portion 110 (having a plurality of rungs or steps), a seating portion 115 (which may include a chair 116 supported on a platform 117) supported by the ladder portion 110, and a plurality of support straps (such as four support straps) 120a, 120b, 120c, 120d for securing the ladder stand 100 on the support structure 105.

In some embodiments, the ladder stand 100 includes a stabilizer bar 125, which may be a single bar, a multiple piece bar, or a telescoping bar. The stabilizer bar 125 may be oriented generally horizontally and may be pivotally connected, releasably connected, or otherwise suitably connected to the ladder portion 110 at a first end 130, and engaged with the support structure 105 at a second end 135. In some embodiments, the second end 135 includes one or more spikes 140 for pressing into the support structure 105 (for example, to dig or stab into a tree for a secure connection with the tree). In other embodiments, spikes 140 may be omitted and the second end 135 may frictionally engage the support structure 105. The ladder portion 110 may be collapsible, telescoping, one integral ladder, or another suitable configuration for forming a ladder structure.

Figure 2:
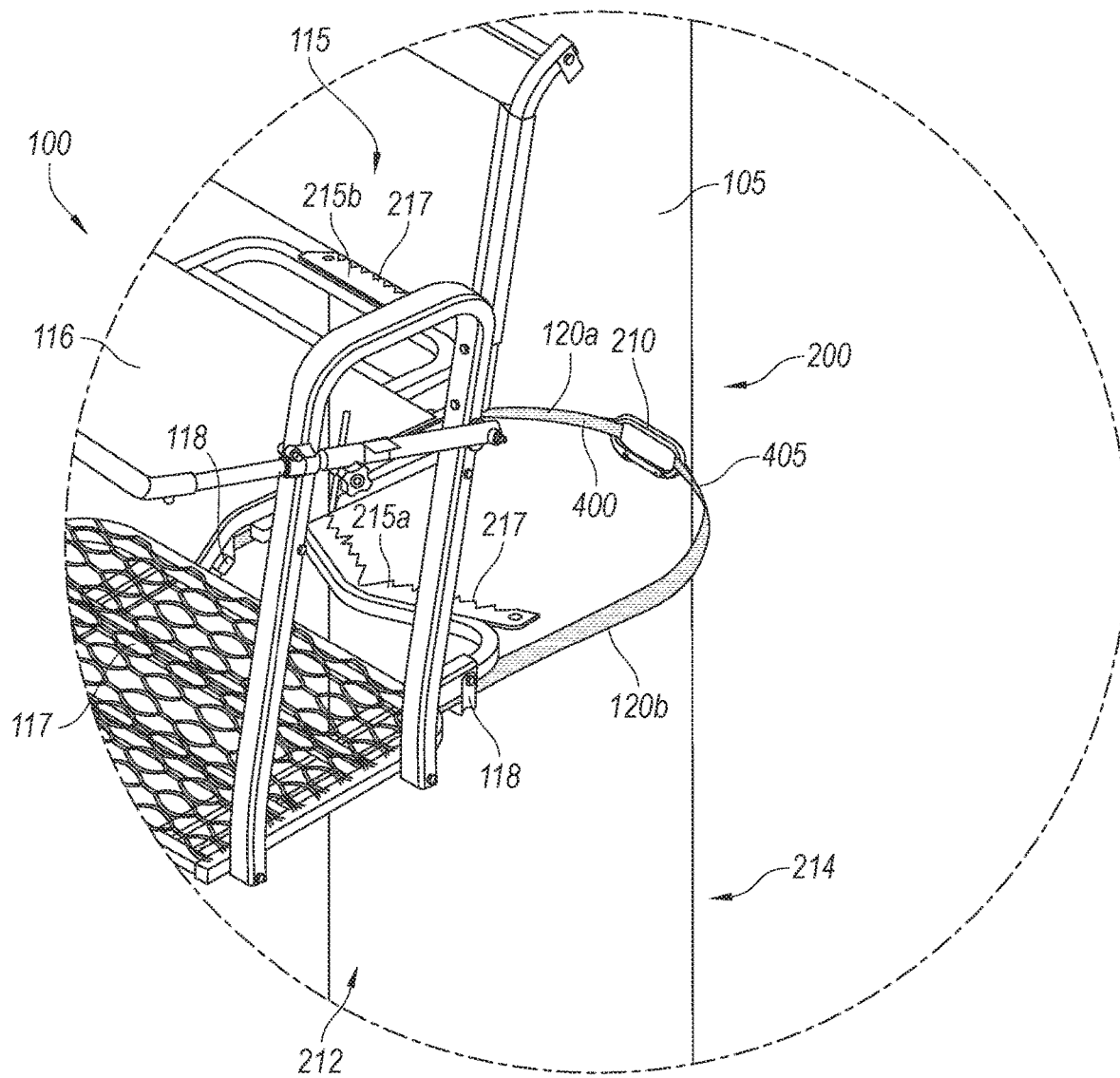
FIG. 2 illustrates a detailed view of a portion of the ladder stand shown in FIG. 1, including an upper connection between the support structure and the ladder stand.

FIG. 2 illustrates a detailed view of a portion of the ladder stand 100, showing an upper connection 200 between the support structure 105 and the ladder stand 100. In some embodiments, a first upper support strap 120a is connected to the ladder stand 100 and wraps partially around the support structure 105, and a second upper support strap 120b is connected to the ladder stand 100 and wraps partially around the support structure 105. The first upper support strap 120a and the second upper support strap 120b may be connected to each other with a connecting device 210.

The ladder stand 100 may be positioned on a first side 212 (such as the front) of the support structure 105, and the connecting device 210 may be positioned on a second side 214 (such as the back) of the support structure 105, opposite the first side 212, or the connecting device 210 may be positioned elsewhere as long as it connects the first and second upper support straps 120a, 120b such that they together wrap around the support structure 105. The connecting device 210 joins the first and second upper support straps 120a, 120b such that they together wrap around the support structure 105 to secure the ladder stand 100 to the support structure 105.

The ladder stand 100 may include one or more blade elements (such as two blade elements, or more blade elements) 215a, 215b. In some embodiments, the blade elements are carried by the seating portion 115 (for example, attached to the chair 116 or the platform 117, or otherwise supported by the platform 117). The blade elements 215a, 215b may include teeth 217 (such as serrations or spikes) for digging or stabbing into the support structure 105. For example, as described in additional detail below, the upper support straps 120a, 120b may be tightened against the support structure 105 to cause a primary blade element 215a (such as a lowermost blade element attached to the platform 117) to press against or into the support structure 105.

Embodiments of the present technology advantageously allow the upper support straps 120a, 120b to create a force that is generally perpendicular to the support structure 105 (such as a horizontal force), as opposed to a force that is oriented at a generally oblique angle relative to the support structure 105. In other words, in some embodiments, the primary blade element 215a and the upper support straps 120a, 120b are positioned to be generally parallel when one or more tensioning devices 300 (described below) apply tension to the upper support straps 120a, 120b so that the primary blade element 215a is positioned and configured to apply a generally horizontal force against or into the support structure 105. Such a perpendicular or horizontal force aids the primary blade element 215a in gripping the support structure 105 and avoids an undesirable upward or downward force on the remainder of the ladder stand 100. This provides improved stability and reliability in the connection between the ladder stand 100 (specifically, the primary blade element 215a) and the support structure 105. Such improved stability and reliability facilitates a safe pre-climb installation process and provides a stable ladder stand 100 that a user can safely climb to complete installation (such as fastening additional straps), as explained in additional detail below.

Figure 3:
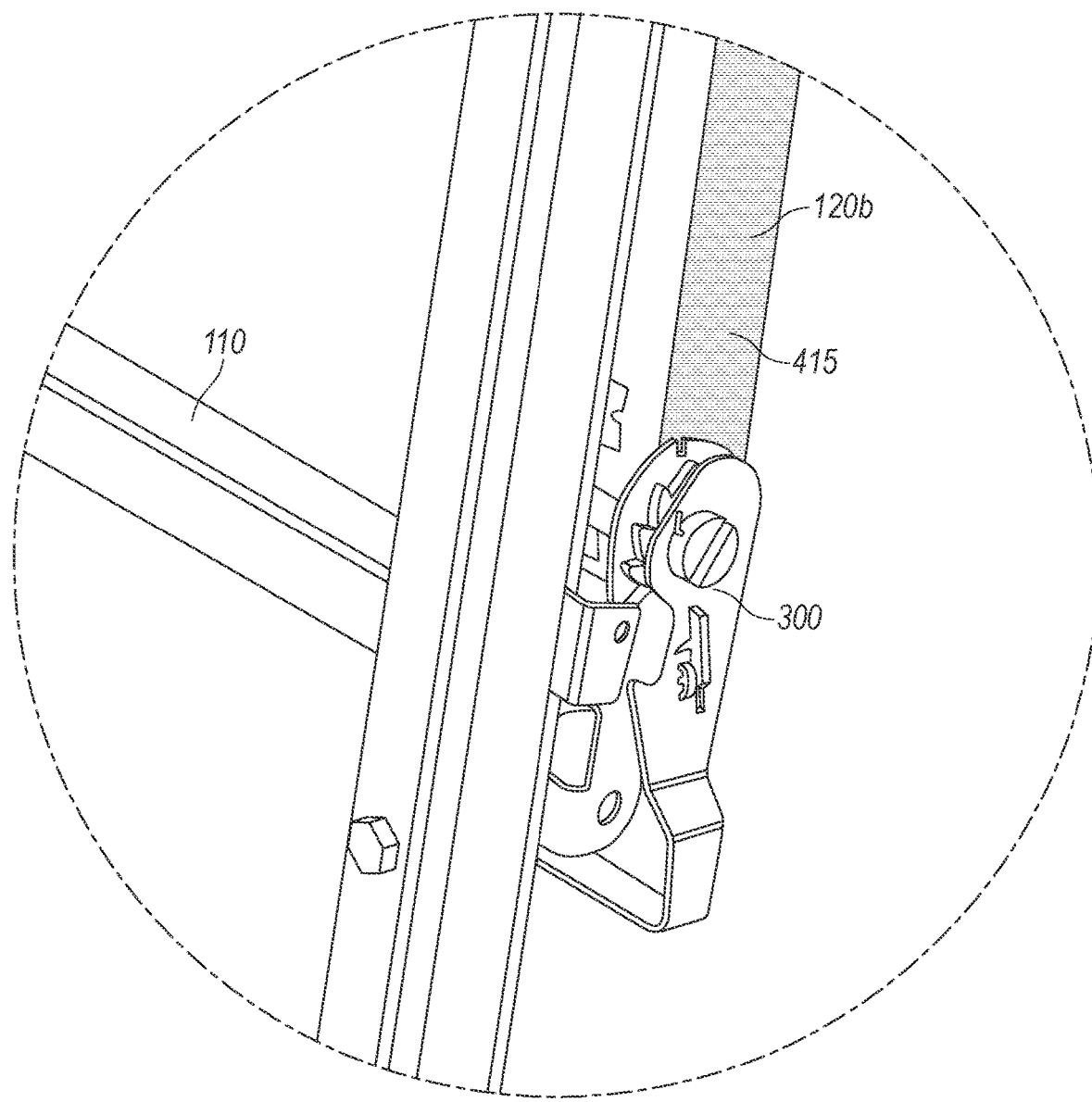
FIG. 3 illustrates a detailed view of a portion of the ladder stand shown in FIG. 1, including a tensioning device attached to the ladder portion and operable to tension an upper support strap, in accordance with embodiments of the present technology.

FIG. 3 illustrates a detailed view of a portion of the ladder stand 100, showing a tensioning device 300 attached to the ladder portion 110 (or otherwise supported by the ladder portion 110) and operable to tighten the second upper support strap 120b, in accordance with embodiments of the present technology. FIG. 3 shows only one side of the ladder portion 110, the second upper support strap (120b), and one tensioning device 300, but FIG. 1 illustrates another tensioning device 300 attached to the other side of the ladder portion 110 and operable to tighten the first upper support strap 120a. In some embodiments, the tensioning devices 300 may include a ratchet device for applying tension to the upper support straps 120a, 120b. Although two tensioning devices 300 are shown in the figures, in some embodiments, more or fewer tensioning devices may be used. For example, one single tensioning device 300 may be implemented to tighten both upper support straps 120a, 120b. The one or more tensioning devices 300 are operable to tighten the upper support straps 120a, 120b to draw the blade elements (such as the primary blade element 215a) against or into the support structure 105.

With reference to FIG. 1, the upper support straps 120a, 120b, which are connected together by the connecting device 210, extend along the platform 117, down the ladder portion 110, to the tensioning devices 300 for a user to tighten the support straps 120a, 120b from a user's position on the ground. In some embodiments, the upper support straps 120a, 120b may be supported by one or more strap supports 118 (such as hooks or loops) attached to the platform 117. In some embodiments, the upper support straps 120a, 120b may be supported by one or more additional strap supports 118 attached to the ladder portion 110. In some embodiments, the straps 120a, 120b may be partially concealed by passing them through or within one or more ladder rails 119 or one or more platform rails 121.

With reference to FIGS. 1 and 2, in some embodiments, the ladder stand 100 may include one or more additional straps and tensioning devices to tighten the ladder stand 100 against the support structure 105, such as one or more additional straps and tensioning devices adjacent to a secondary blade element 215b. Such additional straps may be installed or tightened after the upper support straps 120a, 120b are tightened against the support structure 105. A user may climb the ladder stand 100 after the upper support straps 120a, 120b are tightened, and then a user may install or tighten additional straps.

Although the blade elements 215a, 215b are described as including teeth 217, in some embodiments, the blade elements 215a, 215b may be replaced with, or may include, another suitable structure configured to grip the ladder stand 100 against the support structure 105 when the upper support straps 120a, 120b are tightened against the support structure 105. For example, a gripping structure may include a surface that does not include teeth or spikes but instead is a smooth blade or broad surface that relies on friction against the support structure 105.

With reference to FIG. 1, and as described in additional detail below with regard to FIG. 6, lower support straps 120c, 120d may be connected to the second end 135 of the stabilizer bar 125, wrapped around the support structure 105, and connected together with a tensioning device 300. The tensioning device 300 is operable to tighten the lower support straps 120c, 120d to pull the one or more spikes 140 into the support structure 105 or to otherwise pull the second end 135 against the support structure 105.

Figure 4:
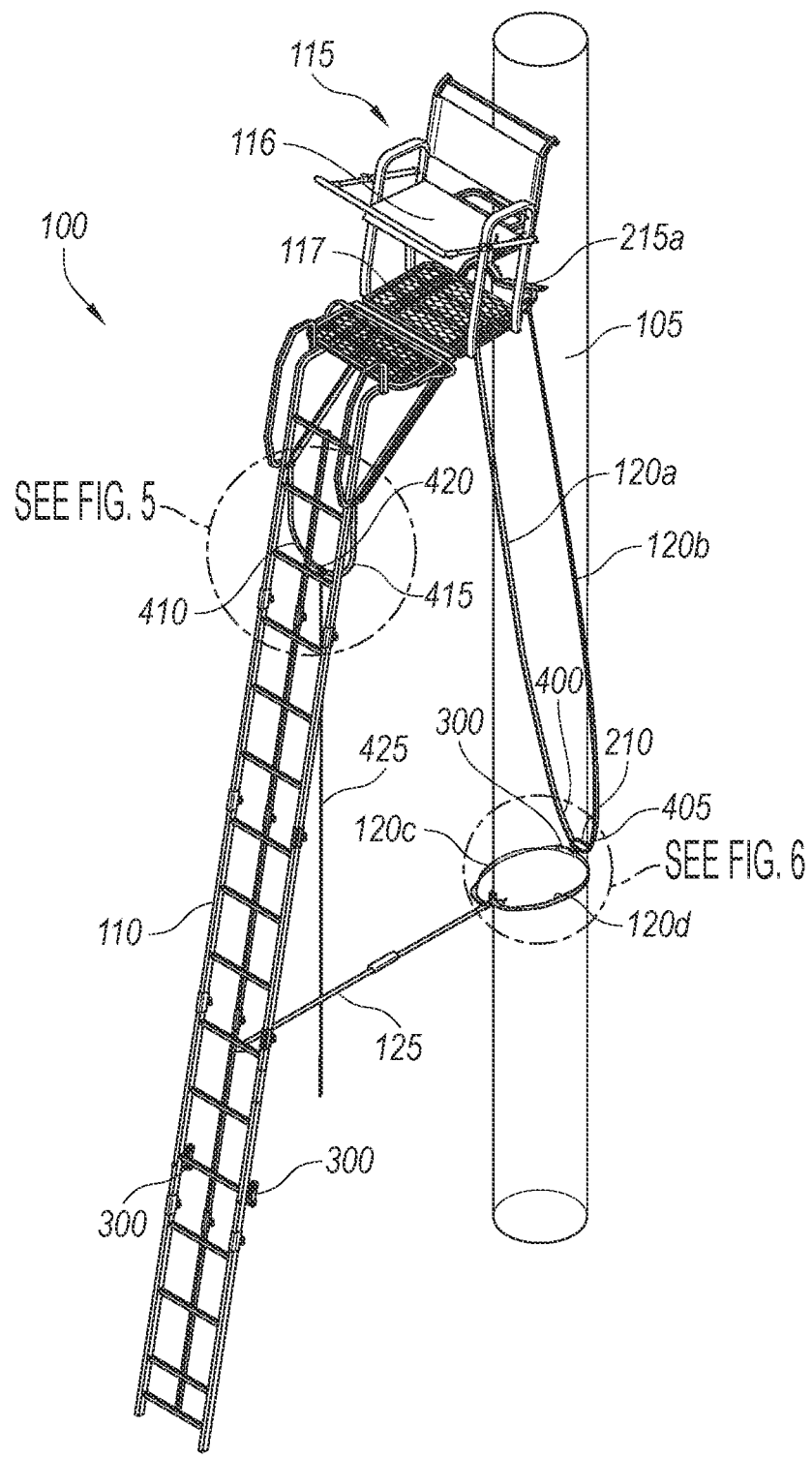
FIG. 4 illustrates the ladder stand shown in FIGS. 1-3 in a pre-climb and pre-installation configuration, in order to illustrate an installation procedure in accordance with embodiments of the present technology.
Figure 5:
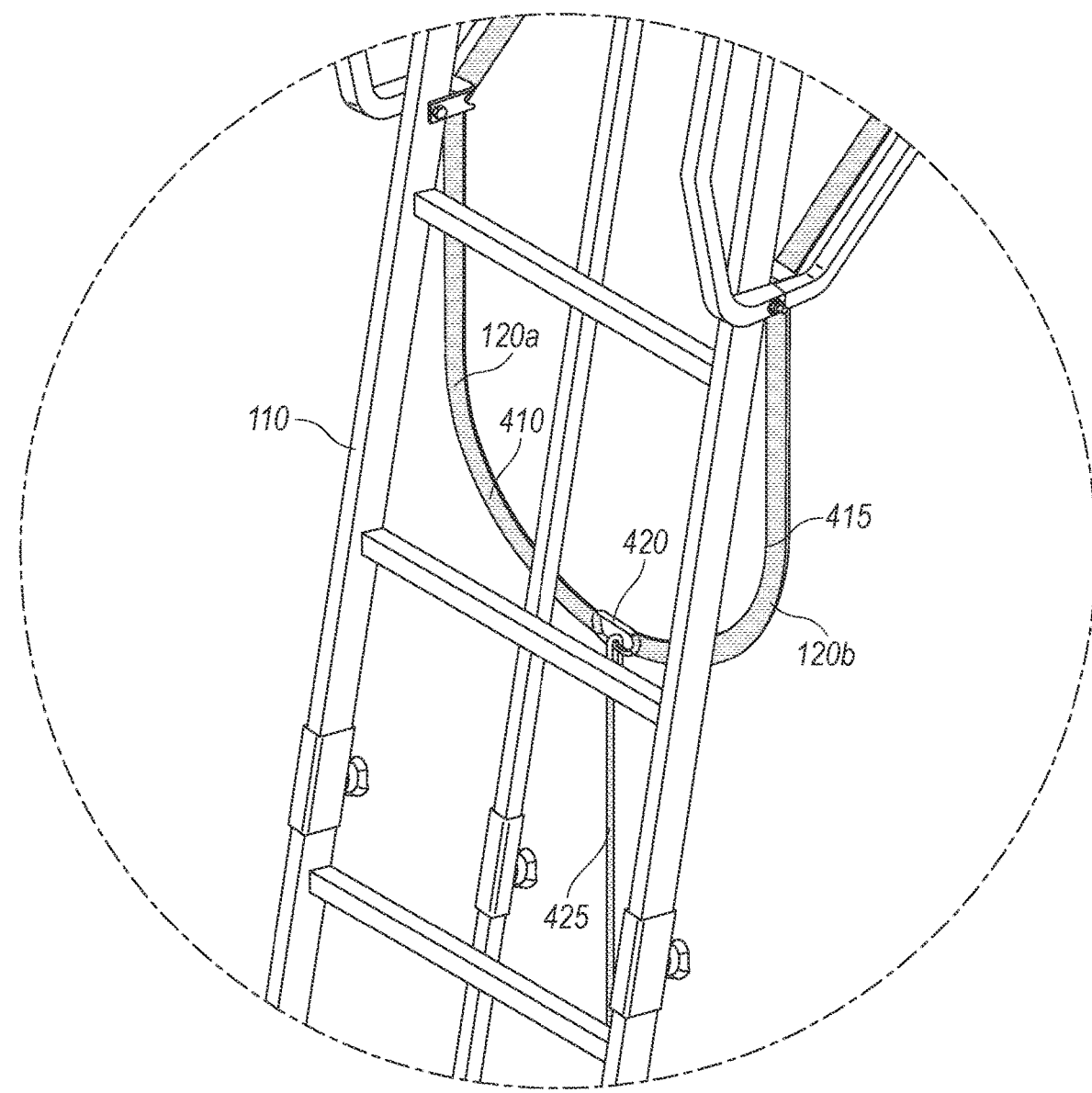
FIG. 5 is a detailed view of a portion of the ladder stand shown in FIG. 4.

FIG. 4 illustrates the ladder stand 100 in a pre-climb and pre-installation configuration, in order to illustrate an installation procedure in accordance with embodiments of the present technology. FIG. 5 is a detailed view of a portion of the ladder stand 100 shown in FIG. 4. FIG. 6 is a detailed view of another portion of the ladder stand 100 shown in FIG. 4. With reference to FIGS. 4-6, embodiments of the present technology include methods of installing a ladder stand against a support structure.

In some embodiments, a user raises the ladder portion 110 and the seating portion 115 to lean against the support structure 105. The user may pass a first end 400 of the first upper support strap 120a and a first end 405 of the second upper support strap 120b around the support structure 105. The user may then connect the first end 400 of the first upper support strap 120a to the first end 405 of the second upper support strap 120b using the connecting device 210. In some embodiments, the connecting device 210 may be a carabiner, a hook, a knot tying the first ends 400, 405 together (directly or with an intermediate tying element), or another suitable device to join the first ends 400, 405. It is preferable that the connecting device 210 is a releasable device, but in other embodiments, it may be permanent (for example, if installation of the ladder stand 100 is intended to be permanent). When the first end 400 of the first upper support strap 120a is connected to the first end 405 of the second upper support strap 120b, the support structure 105 is positioned between the first upper support strap 120a, the second upper support strap 120b, and the primary blade element 215a.

To tighten the connected upper support straps 120a, 120b against the support structure 105, a user may pull a second end 410 of the first upper support strap 120a and a second end 415 of the second upper support strap 120b. By pulling the second ends 410, 415 of the upper support straps 120a, 120b, the upper support straps 120a, 120b are put under tension, the connecting device 210 moves upward along the support structure 105, and eventually becomes generally level with the primary blade element 215a (for example, the connecting device 210 and the first ends 400, 405 move from a position shown in FIGS. 4 and 6, to a position shown in FIGS. 1 and 2). Continued tension on the upper support straps 120a, 120b draws the primary blade element 215a against or into the support structure 105 to provide a secure connection between the ladder stand 100 and the support structure 105.

In some embodiments, to assist a user in pulling down on the second ends 410, 415 of the upper support straps 120a, 120b to apply tension, the second ends 410, 415 may be connected to each other using a connecting device 420, which may be a connecting device such as a carabiner, a hook, a knot tying the second ends 410, 415 together (directly or with an intermediate tying element), or another suitable device to join the second ends 410, 415. It is preferable that the connecting device 420 is a releasable device, but in some embodiments, it may be permanent. In some embodiments, a cord 425 may be connected to the second ends 410, 415 of the upper support straps 120a, 120b such that it hangs near the ground (at a lower height, below the platform 117). Such a cord 425 may be positioned and configured to allow a user to reach the cord 425 to aid in pulling the upper support straps 120a, 120b while tensioning the upper support straps 120a, 120b (for example, by pulling the cord 425 downward). In some embodiments, when the upper support straps 120a, 120b are in a tensioned configuration, or the connecting device 210 attached to the first ends 400, 405 of the upper support straps 120a, 120b has generally reached the height of the primary blade element 215a, a user may disconnect the connecting device 420 to remove the cord 425 and separate the second ends 410, 415 of the upper support straps 120a, 120b. Each of the second ends 410, 415 of the upper support straps 120a, 120b may be passed through or into a corresponding tensioning device 300 on the ladder portion 110, and the upper support straps 120a, 120b may be further tensioned using the tensioning devices 300. In some embodiments, the second ends 410, 415 of the upper support straps 120a, 120b may be passed into the same tensioning device 300 to tension the upper support straps 120a, 120b.

Returning to FIG. 1, which illustrates the upper support straps 120a, 120b in a tensioned configuration, the upper support straps 120a, 120b may be tensioned individually and to different levels of tension (for example, when each upper support strap 120a, 120b is tightened by its own corresponding tensioning device 300, as illustrated in FIG. 1). Preferably, the upper support straps 120a, 120b do not cross each other on the second side 214 (the back side) of the support structure 105, opposite the remainder of the ladder stand 100. An advantage of embodiments of the present technology is that the separate upper support straps 120a, 120b (which may only be connected to each other on the second side 214 (the back side) of the support structure 105 opposite the remainder of the ladder stand 100 via the connecting device 210 at the first ends 400, 405) can be tensioned individually to adapt to support structures 105 (such as trees) that have uneven shapes. A user may tighten each support strap 120a, 120b independently from the other to ensure a desired level of contact between the primary blade element 215a and the support structure 105. More specifically, trees are not uniform, and embodiments of the present technology avoid problems with existing tree stands that often have uneven contact with support structures.

Another advantage of ladder stands configured in accordance with embodiments of the present technology is the ability to pass over or around obstructions extending from support structures 105, such as tree branches. For example, FIG. 1 shows an obstruction 430 extending from the support structure 105. Because the upper support straps 120a, 120b are separable from each other and connectable using the connecting device 210, a user may toss (or otherwise pass) one or both first ends 400, 405 of the upper support straps 120a, 120b over the obstruction 430 to position both first ends 400, 405 on the same side of the obstruction. In some embodiments, a user may hoist one or both first ends 400, 405 over the obstruction using the stabilizer bar 125 as a tool. When the first ends 400, 405 are on the same side of the obstruction 430, the first ends 400, 405 may be connected to each other using the connecting device 210, after which a user may tension the upper support straps 120a, 120b to pull the connecting device 210 and the first ends 400, 405 into position (such as the position illustrated in FIG. 1), bypassing the obstruction 430.

Figure 6:
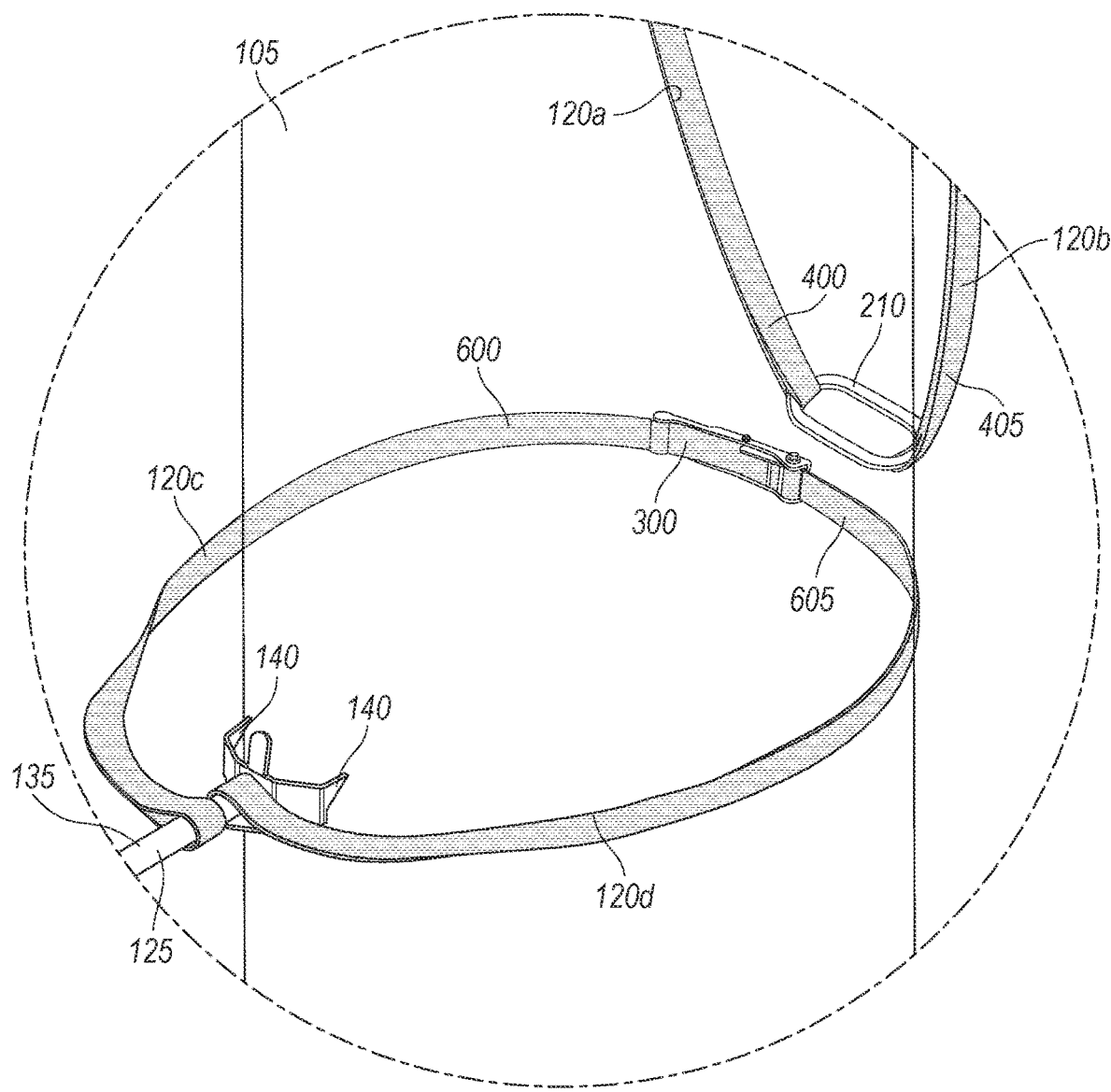
FIG. 6 is a detailed view of another portion of the ladder stand shown in FIG. 4.

With reference to FIG. 6, a tensioning device 300 may connect first ends 600, 605 of the lower support straps 120c, 120d such that the lower support straps 120c, 120d wrap around the support structure 105. The tensioning device 300, which may be similar to other tensioning devices described herein, may tighten the lower support straps 120c, 120d to draw the stabilizer bar 125 toward the support structure 105. With reference to FIGS. 1 and 4, the stabilizer bar 125 passes from the ladder portion 110 to the support structure 105 to further stabilize the ladder stand 100.

Some embodiments of the present technology include a kit of parts for assembling or installing a ladder stand. Kits of parts in accordance with embodiments of the present technology include some or all of a variety of the elements of a ladder stand described herein. For example, a kit of parts may include a ladder portion, a seating portion, a plurality of straps, one or more connecting devices, one or more tensioning devices, one or more cords, a stabilizer bar, or other components.

Ladder stands configured in accordance with embodiments of the present technology improve safety by facilitating a stable attachment to support structures before a user climbs the ladder stand to complete assembly (completing assembly may include adding further support straps to draw a secondary blade element 215b against or into the support structure). Ladder stands configured in accordance with embodiments of the present technology further facilitate stability in the installation process by applying a generally horizontal force against or into the support structure, rather than a generally downward force.

From the foregoing, it will be appreciated that specific embodiments of the presently disclosed technology have been described herein for purposes of illustration, but that various modifications may be made without deviating from the scope of the technology. For example, ladder stands configured in accordance with embodiments of the present technology may include more or fewer support straps, they may omit a chair (instead having a generally bare platform supported on the ladder portion), they may have another seating, standing, or housing structure on the platform instead of (or in addition to) a chair portion, they may be foldable, collapsible, or able to be disassembled, they may be made of various materials (metals, plastics, composites, or other materials), they may include additional support structure, or they may include steps or stairs instead of ladder rungs. Although a chair with arms and a back is illustrated in the figures, the term "chair" is understood to include a bench without arms or a back, or another suitable seating surface. Although preferred embodiments of the present technology include upper support straps 120a, 120b that are separable from each other and connectable using the connecting device 210 (in order to avoid obstructions, for example), in some embodiments, the upper support straps 120a, 120b may be combined in a single integral support strap. For example, a single integral support strap may extend between free ends that correspond to the first ends 400, 405, which may be connected together using a connecting device 210, and then the strap may be tightened in a manner similar to the separable upper support straps 120a, 120b (e.g., by passing the single support strap through one or more tightening devices 300). In some embodiments, a single integral support strap may extend between free ends that correspond to the second ends 410, 415 (such that the strap may be continuous as it wraps around the tree), although such a single integral support strap may not provide the advantages of separate upper support straps 120a, 120b (such as the ability to pass over or around an obstruction).

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method of installing a ladder stand against a support structure, the ladder stand comprising a ladder portion, a platform attached to the ladder portion, and a blade element attached to the platform, the method comprising:
   raising the ladder portion and the platform to lean the platform against the support structure;
   passing a first end of a first strap around the support structure;
   passing a first end of a second strap around the support structure;
   connecting the first end of the first strap to the first end of the second strap with a connecting element, wherein connecting the first end of the first strap to the first end of the second strap comprises positioning the support structure between the first strap, the second strap, and the blade element;
   pulling on the first strap and the second strap to apply tension to the first strap and the second strap, wherein applying tension to the first strap and the second strap causes the connecting element to move upwards along the support structure; and
   applying tension to the first strap and the second strap to draw the blade element against the support structure or into the support structure.

2. The method of claim 1 wherein passing the first end of the first strap around the support structure, passing the first end of the second strap around the support structure, and connecting the first end of the first strap to the first end of the second strap comprises passing both first ends around an obstruction on the support structure before connecting the first ends together.

3. The method of claim 1, wherein using tension on the first strap and the second strap to draw the blade element against the support structure or into the support structure comprises applying tension to either the first strap or the second strap independently of the other.

4. The method of claim 1, further comprising passing a second end of the first strap and a second end of the second strap through one or more strap supports on the ladder stand to extend the first strap and the second strap along the ladder portion.

5. The method of claim 1, wherein pulling on the first strap and the second strap comprises connecting a second end of the first strap to a second end of the second strap and to a cord, and wherein pulling on the first strap and the second strap comprises pulling the cord.

6. The method of claim 1, comprising positioning the connecting element such that the support structure is between the connecting element and the platform.

7. The method of claim 1, further comprising operating a tensioning device attached to the ladder portion to apply tension to the first strap or the second strap.

8. The method of claim 1, wherein:
   the ladder stand further comprises a stabilizer bar connected to, or connectable to, the ladder portion;
   the method further comprises positioning an end of the stabilizer bar to contact the support structure; and
   applying tension to the first strap and the second strap causes the connecting element to move away from the end of the stabilizer bar.

9. A method of installing a stand on a support structure, the stand comprising a platform, the method comprising:

raising the platform to lean the platform against the support structure;

passing a first end of a first strap around the support structure;

passing a first end of a second strap around the support structure;

connecting the first end of the first strap to the first end of the second strap, wherein connecting the first end of the first strap to the first end of the second strap comprises positioning the support structure between the first strap, the second strap, and the platform;

pulling on the first strap and the second strap to apply tension to the first strap and the second strap, wherein applying tension to the first strap and the second strap causes a connection between the first end of the first strap and the first end of the second strap to move upwards along the support structure; and applying tension to the first strap and the second strap to draw the platform against the support structure or into the support structure.

10. The method of claim 9, wherein connecting the first end of the first strap to the first end of the second strap comprises connecting the first end of the first strap to the first end of the second strap with a connection element.

11. The method of claim 9, wherein the stand further comprises a ladder portion attached to or attachable to the platform, wherein raising the platform to lean the platform against the support structure comprises raising the ladder portion along with the platform.

12. The method of claim 11, further comprising operating a ratchet device attached to the ladder portion to apply tension to the first strap or the second strap.

13. The method of claim 11, wherein:
the stand further comprises a stabilizer bar connected to, or connectable to, the ladder portion;
the method further comprises positioning an end of the stabilizer bar to contact the support structure; and
applying tension to the first strap and the second strap causes the connection between the first end of the first strap and the first end of the second strap to move away from the end of the stabilizer bar.

14. The method of claim 9, wherein the platform comprises a blade element, and wherein drawing the platform against the support structure or into the support structure comprises drawing the blade element against the support structure or into the support structure.

15. A method of installing a ladder stand against a support structure, the ladder stand comprising a ladder portion, a platform attached to the ladder portion, and a stabilizer bar connected to, or connectable to, the ladder portion, the method comprising:
raising the ladder portion and the platform to lean the platform against the support structure;
passing a first end of a first strap around the support structure;
passing a first end of a second strap around the support structure;
connecting the first end of the first strap to the first end of the second strap, wherein connecting the first end of the first strap to the first end of the second strap comprises positioning the support structure between the first strap, the second strap, and the platform;
positioning an end of the stabilizer bar to contact the support structure;
pulling on the first strap and the second strap to apply tension to the first strap and the second strap, wherein applying tension to the first strap and the second strap causes a connection between the first end of the first strap and the first end of the second strap to move upwards along the support structure away from the end of the stabilizer bar; and
applying tension to the first strap and the second strap to draw the platform against the support structure or into the support structure.

16. The method of claim 15, wherein using tension on the first strap and the second strap to draw the platform against the support structure or into the support structure comprises applying tension to either the first strap or the second strap independently of the other.

17. The method of claim 15, further comprising passing a second end of the first strap and a second end of the second strap through one or more strap supports on the ladder stand to extend the first strap and the second strap along the ladder portion.

18. The method of claim 15, comprising positioning the connection between the first end of the first strap and the first end of the second strap such that the support structure is between the connection and the platform.

19. The method of claim 15, further comprising operating a tensioning device attached to the ladder portion to apply tension to the first strap or the second strap.

20. The method of claim 15, wherein the platform comprises a blade element, and wherein drawing the platform against the support structure or into the support structure comprises drawing the blade element against the support structure or into the support structure.

\* \* \* \* \*